US010824451B2

(12) United States Patent  
Catherall et al.

(10) Patent No.: US 10,824,451 B2  
(45) Date of Patent: Nov. 3, 2020

(54) HARDWARE SIMULATION

(71) Applicant: ARM Limited, Cambridge (GB)

(72) Inventors: Robert James Catherall, Cambridge (GB); Anthony Neil Berent, Cambridge (GB); Rhys David Copeland, Cambridge (GB); Mark Edgeworth, Cambridge (GB); Jonathan Stephen Black, Cambridge (GB)

(73) Assignee: ARM LIMITED, Cambridge (GB)

( * ) Notice: Subject to any disclaimer, the term of this patent is extended or adjusted under 35 U.S.C. 154(b) by 1454 days.

(21) Appl. No.: 14/619,881

(22) Filed: Feb. 11, 2015

(65) Prior Publication Data

US 2015/0261551 A1    Sep. 17, 2015

(30) Foreign Application Priority Data

Mar. 11, 2014    (GB) .................................. 1404222.0

(51) Int. Cl.
*G06F 9/455* (2018.01)
*G06F 30/20* (2020.01)

(52) U.S. Cl.
CPC .............. *G06F 9/455* (2013.01); *G06F 30/20* (2020.01)

(58) Field of Classification Search
None
See application file for complete search history.

(56) References Cited

U.S. PATENT DOCUMENTS 5,838,948 A * 11/1998 Bunza ................... G06F 11/261  
703/27  
8,229,726 B1    7/2012 Magdon-Ismail et al.  
(Continued)

FOREIGN PATENT DOCUMENTS

WO    WO 2005/093575    10/2005  
WO    WO 2005093575 A1 * 10/2005 ............ G06F 11/261

OTHER PUBLICATIONS

Merrill, Duane et al., "High Performance and Scalable Radix Sorting: A Case Study of Implementing Dynamic Parallelism for GPU Computing", Mar. 2011, Department of Computer Science, University of Virginia.*

(Continued)

*Primary Examiner* — Cedric Johnson  
(74) *Attorney, Agent, or Firm* — Nixon & Vanderhye PC

(57) ABSTRACT

Simulation of execution of a processing workload by a target hardware device is provided by providing workload data specifying the processing workload, passing the workload data to both a primary partial simulation and a complementary partial simulation that run in parallel and acquire input data from different levels of abstraction of the target hardware and then simulating execution of the processing workload using a primary partial simulation to generate primary partial result state data and using the complementary partial simulation to generate complementary partial result state data. The target hardware device may be a graphics processing unit and the workload data may specify the processing to be performed in a hardware independent form, such as, for example, OpenGL ES. The host system supporting the simulation may include a graphics processing unit serving to provide the complementary partial simulation due to its own execution of the workload data.

23 Claims, 3 Drawing Sheets

(56) References Cited

U.S. PATENT DOCUMENTS

| | | | | |
|---|---|---|---|---|
| 2008/0055321 | A1* | 3/2008 | Koduri | G06T 13/00 345/505 |
| 2009/0281783 | A1* | 11/2009 | Bitar | G06F 11/3457 703/21 |
| 2011/0184713 | A1* | 7/2011 | Yang | G06F 17/5022 703/13 |
| 2014/0107995 | A1* | 4/2014 | Kostick | G06F 17/5009 703/13 |

OTHER PUBLICATIONS

Pipis, A. et al., "A Hybrid Approach for the Modeling and Simulation of a Virtually Shared Memory Parallel Computer Architecture", 2001, Mathematics and Computers in Simulation, 57, Elsevier Science B.V.*

GB Search Report for GB No. 1404222.0, dated Aug. 18, 2014, 3 pages.
Linaro Wiki, "Platform/DevPlatform/Specs/Oneiric-QemuOpenGLES", (Jun. 3, 2014), 2 pages.
RealView Compilation Tools, Version 2.2, pp. 391-414, Chapter 7, "Semihosting", ARM DUI 0205F, (2005 ARM Limited), 468 pages.
"Virgil 3D Architecture and Design", Google document, (Jun. 3, 2014), 6 pages.
Wang, J. et al., "A Collaborative Model of Low-Level and High-Level Descriptors for Semantics-based Music Information Retrieval", pp. 532-535, IEEE, (2008), 4 pages.
Thayananthan, A. et al., Principled Fusion of High-level Model and Low-level Cues for Motion Segmentation, (Jun. 23-28, 2008), IEEE, 8 pages.
Office Action issued in Application No. GB1404222.0 dated Dec. 17, 2019 (4 pages).

* cited by examiner

HARDWARE SIMULATION

BACKGROUND OF THE INVENTION

This application claims priority to GB Application No. 1404222.0, filed 11 Mar. 2014, the entire content of which is hereby incorporated by reference.

BACKGROUND

This technique relates to the field of data processing systems. More particularly, it relates to the simulation of a target hardware device.

As data processing systems become more complex, there is an increasing need for simulation of target hardware before the real hardware becomes available for testing. Such simulation can permit software associated with the target hardware, and complementary hardware intended to operate with the target hardware, to be developed in advance of the target hardware itself being available. As an example, a graphics processing unit may take several years to develop and it is important that when the graphics processing unit hardware becomes available there should be application software, driver software and associated complementary hardware all available and tested ready to be used with the graphics processing unit.

As the target hardware devices to be simulated become more complex, the task of providing a simulation in place of the real target hardware itself becomes a significant engineering task. Techniques for structuring the simulation of a target hardware device in a manner which eases the engineering burden of generating that simulation and yet provides the ability to provide the desired simulation environment are advantageous.

SUMMARY

At least some embodiments provide a method of simulating execution of a processing workload by a target hardware device including generating result state data, said method comprising the steps of:

providing workload data specifying said processing workload;

passing said workload data both to a primary partial simulation and to a complementary partial simulation running in parallel and acquiring input data from different levels of abstraction of said target hardware;

simulating execution of said processing workload using said primary partial simulation to generate primary partial result state data representing at least part of said result state data; and simulating execution of said processing workload using said complementary partial simulation to generate complementary partial result state data representing at least part of said result state data At least some embodiments provide an apparatus for executing a processing workload specified by workload data to generate result state data in place of a target hardware device, said apparatus comprising:

a workload allocator configured to pass said workload data both to a primary simulator and to a complementary simulator; wherein said primary partial simulator is configured to execute said processing workload to generate primary partial result state data representing at least part of said result state data; and said complementary partial simulator is configured to execute said processing workload to generate complementary partial result state data representing at least part of said result state data, wherein said primary partial simulator and said complementary partial simulator are configured to run in parallel and to acquire input data from different levels of abstraction of said target hardware.

At least some embodiments provide a computer program, such as a computer program stored upon a non-transitory computer readable medium, for controlling a computer to perform the method as specified previously.

The above, and other objects, features and advantages will be apparent from the following detailed description of illustrative embodiments which is to be read in connection with the accompanying drawings.

DESCRIPTION OF EXAMPLE EMBODIMENTS

Figure 1:
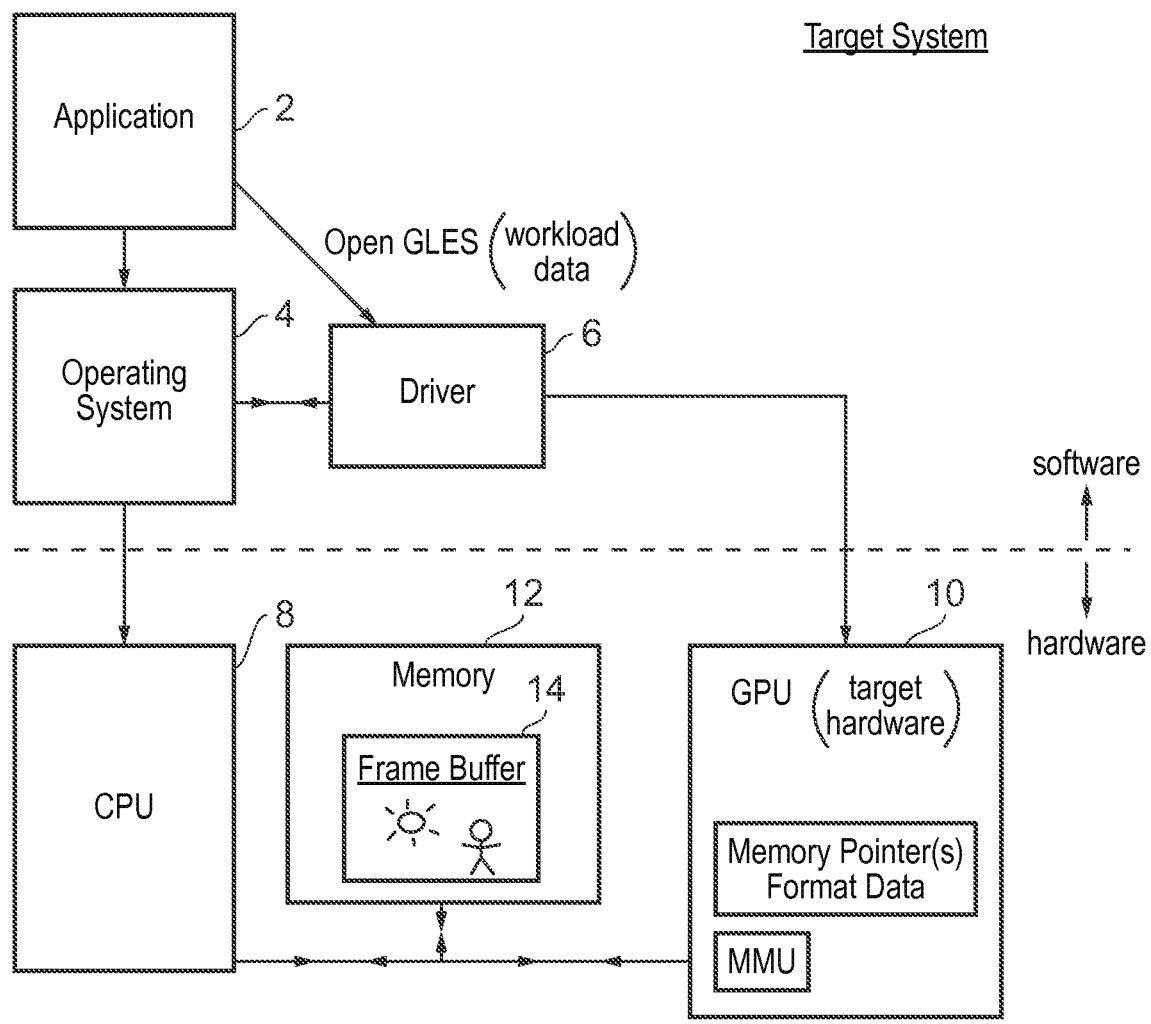
FIG. 1 schematically illustrates a target system to be simulated.

The present technique recognises that in some circumstances the simulation of a target hardware device may be provided using a primary partial simulation and a complementary partial simulation running in parallel with inputs taken from different levels of abstraction and executing the same processing workload to generate respective first partial result state data and second partial result state data. The technique recognises that there is no need to simulate the operation of the target hardware device from end-to-end but rather that multiple partial simulations may be provided operating in parallel at different levels of abstraction from the target hardware so as to generate respective partial result state data appropriate to their respective levels of abstraction. This can permit other systems to interact with the simulation of the target hardware device so as to verify their own proper behaviour with a reduced engineering burden associated with the provision of the simulation of the target hardware device.

The overlap between the two partial simulations is in two places. Input—the common workload required to drive the two partial simulations. Output—the point where the results from both sides must be drawn together to create the final overall simulation.

The provision of partial simulations working to produce respective partial result state data is facilitated when the workload data specifies the processing workload is in a form independent of a hardware implementation of the target device. It is becoming increasingly common for processing workloads to be specified in a way abstracted from the hardware which will execute those processing workloads in order to make the processing workloads more portable between different hardware implementations. As an example, it is known to provide standard application programming interfaces (APIs) for specifying graphics processing workloads which can then be performed by graphics processing hardware that varies significantly in its architecture and implementation and yet is able to respond to a workload specified by the use of the common API.

Having the low level register modelling in combination with high level API calls (via the >shim) means that some embodiments retain register level accuracy where appropriate, but speed up other calls via the API shim to a native GPU. Other advantages in at least some embodiments include:

- A simulation with higher performance than a pure software simulation by taking advantage of an existing hardware implementation e.g. a host GPU or previous generation of the target being simulated
- A reduction in the time and cost of producing a simulation model of a new GPU because it reduces the level of modelling required
- An accurate register view that allows a real driver to run on the simulated hardware. This allows one to solve integration issues that may occur with an operating system (OS), a window manager, other peripherals and their corresponding drivers.

In some embodiments the primary partial result data includes simulated hardware register content of the target hardware. Hardware register content represents an important interface with other systems, both software and hardware, and accordingly represents an aspect of the behaviour of the target hardware device that should be simulated in order to provide a useful simulation.

Another important aspect of the partial simulation provided is that the complementary partial result data includes output data to be stored within a memory as an output of the processing workload, the memory serving as a simulated memory of the target hardware. It is common for target hardware to generate results which are stored within a memory and that is then accessed by other hardware or software systems. In order to usefully simulate the target hardware device, the complementary partial simulation acts to generate such output data and store it within a memory from where other hardware and software to be tested operating in conjunction with the target hardware device may access that data.

In the context of storing output data within a memory, the primary partial result state data which is operating at a different level of abstraction may generate a memory pointer value indicating an address within a memory at which the output data is to be written. This is a useful mechanism whereby the output data may be generated at a high level of abstraction, but a lower level more hardware based level of simulation is required to generate a memory pointer value that will track the behaviour of the target hardware device when it is produced and which will control the storage of the output data into the appropriate locations.

Another example of the behaviour of the primary partial simulation is that the primary partial result state data includes format data which is read by the complementary partial simulation and specifies one or more parameters of a format in which the output data is to be written to the memory by the complementary partial simulation. Thus, while in some respects the complementary partial simulation and the primary partial simulation operate at different levels of abstraction in parallel, a better and more useful simulation may be achieved by structuring the simulation such that the complementary partial simulation is able to access format data provided by the primary partial simulation as part of the primary partial result state data so as to influence the form of the output data. Selected mechanisms for interaction between the complementary partial simulation and the primary partial simulation are provided so that the behaviour of the two partial simulations may more accurately reflect the intended behaviour of the target hardware device. A further example of such a link is that the primary partial result state data may include one or more pointer values specifying respective addresses within the memory for storing additional state data for use in the simulated execution of the processing workload by the complementary partial simulation, the primary partial simulation or both.

In this context, in some embodiments the primary partial result state data may include memory address translation data corresponding to page table data used by a memory management unit of the target hardware being simulated. The complementary partial simulation can read this memory address translation data and generate memory addresses for the memory in dependence upon the memory address translation data which is formed and managed as part of the primary partial result state data generated by the primary partial simulation.

In some embodiments the complementary partial simulation may be performed using a host processing device including host execution hardware having the processing workload as a native workload. The increasing use of abstraction in specifying processing workloads has the result that in many instances, an existing host processing device that is able to execute at least part of the processing workload as a native workload will already exist and can be used efficiently to provide at least part of the complementary partial simulation.

As an example of the above, when the processing workload is a hardware-independent graphics program, in some embodiments an existing graphics processing unit which is able to execute that hardware-independent graphics program may be used to provide at least part of the complementary partial simulation and generate complementary partial result state data which can be modified/adjusted/integrated with the primary partial simulation and the primary partial result state data in a manner that reflects the behaviour of the target hardware device at a suitable level of accuracy.

In some embodiments the primary partial simulation may use a target device driver for the target hardware device together with a target operating system to generate the primary partial result state data. This arrangement permits the target device driver and the target operating system to be tested prior to the target hardware device actually becoming available.

The coordination of the complementary partial simulation and the primary partial simulation may be enhanced when the complementary partial result state data and the primary partial result state data both include an additional common data marker that allows correlation of the two partial simulations.

In some instances the complementary and primary simulations will generate different dynamic return values to allow future reference to the same state in the system. The client application can only cope with a single value and so a single canonical representation is chosen whilst still allowing the application to access the referenced state in both simulations. In order to address this issue, the method may include the step of translating between dynamic variables generated by the first simulation and dynamic variables generated by the second simulation. In some embodiments this translation may be performed using mapping data maintained as part of the complementary partial simulation.

In some embodiments the primary simulation calls a unique, reserved software interrupt to pass data from the primary partial simulation to the complementary partial simulation. This is an efficient mechanism to allow data to be passed to the complementary simulation so that it has something to work on.

The cooperation between the complementary partial simulation and the primary partial simulation may be further enhanced to increase the accuracy of the modelling of the target hardware device in some embodiments in which the primary partial simulation generates a progress signal indicating completion of a portion of the processing workload in dependence upon detecting completion of that portion of the workload by the complementary partial simulation.

This progress signal may be arranged to simulate an interrupt signal that will be generated by the target hardware device.

In some embodiments the input to the complementary partial simulation may be provided by one or more pointer values within the workload data. Those pointer values may be used by the complementary partial simulation itself to read input data from the result state data of the overall simulation or alternatively the pointer values may be read by a shim (library) on behalf of the complementary partial simulation with those input data values then being passed to the complementary partial simulation by the shim.

FIG. 1 schematically illustrates a target system to be simulated. The target system includes software components comprising an application program 2, an operating system 4 and a software driver 6. The target system further comprises hardware elements in the form of a general purpose central processing unit 8, a graphics processing unit 10 and a memory 12. In the system illustrated, the graphics processing unit 10 is the target hardware device to be simulated as the real hardware is not yet available. It is desired to test the interaction of the CPU 8 and the memory 12 with the graphics processing unit 10. Furthermore, it is desired to test the operation of the application program 2, the operating system 4 and the driver program 6 with the graphics processing unit 10 and with the remainder of the target system. It will be appreciated that the target system could include further elements, such as a video decoder and corresponding driver.

The application program 2 provides a processing workload to be executed by the graphics processing unit 10 (target hardware device). This processing workload is specified as, for example, OpenGL ES commands. The OpenGL ES commands constitute workload data which is passed to the driver program 6 which in turn generates appropriate program code (at a different level of abstraction) to be executed by the graphics processing unit 10. The workload data in the form of OpenGL ES commands specifies the processing workload to be performed in a form that is independent of the implementation of the target hardware device. The workload data accordingly has a given level of abstraction from the implementation of the target hardware device in the form of the graphics processing unit 10. The results of executing the processing workload corresponding to the workload data include image data written into a frame buffer 14 within the memory 12 by the graphics processing unit 10. The form of this image data written into the frame buffer 14 will be substantially independent of the hardware implementation of the graphics processing unit 10. This abstraction allows the developer of the application program 2 to provide the application program in a form which can be executed by a variety of forms of graphics processing unit 10. The graphics driver 6 converts the workload data in the form of OpenGL ES commands into program instructions directed to the particular architecture and implementation of the graphics processing unit 10 with which it is associated. It will be appreciated that the workload could have a form different from OpenGL ES.

The graphics driver 6 generates result state data which includes memory pointers indicating the locations within the memory 12 to which output data in the form of output image data is to be written. Configuration of the graphics processing unit 10 via the driver program 6 can also set parameters indicating the format of the output data. Furthermore, the graphics processing unit 10 may utilise a memory management unit configured using memory address translation data for translating between memory addresses as used by the graphics processing unit 10 and physical memory addresses within the memory 12.

Figure 2:
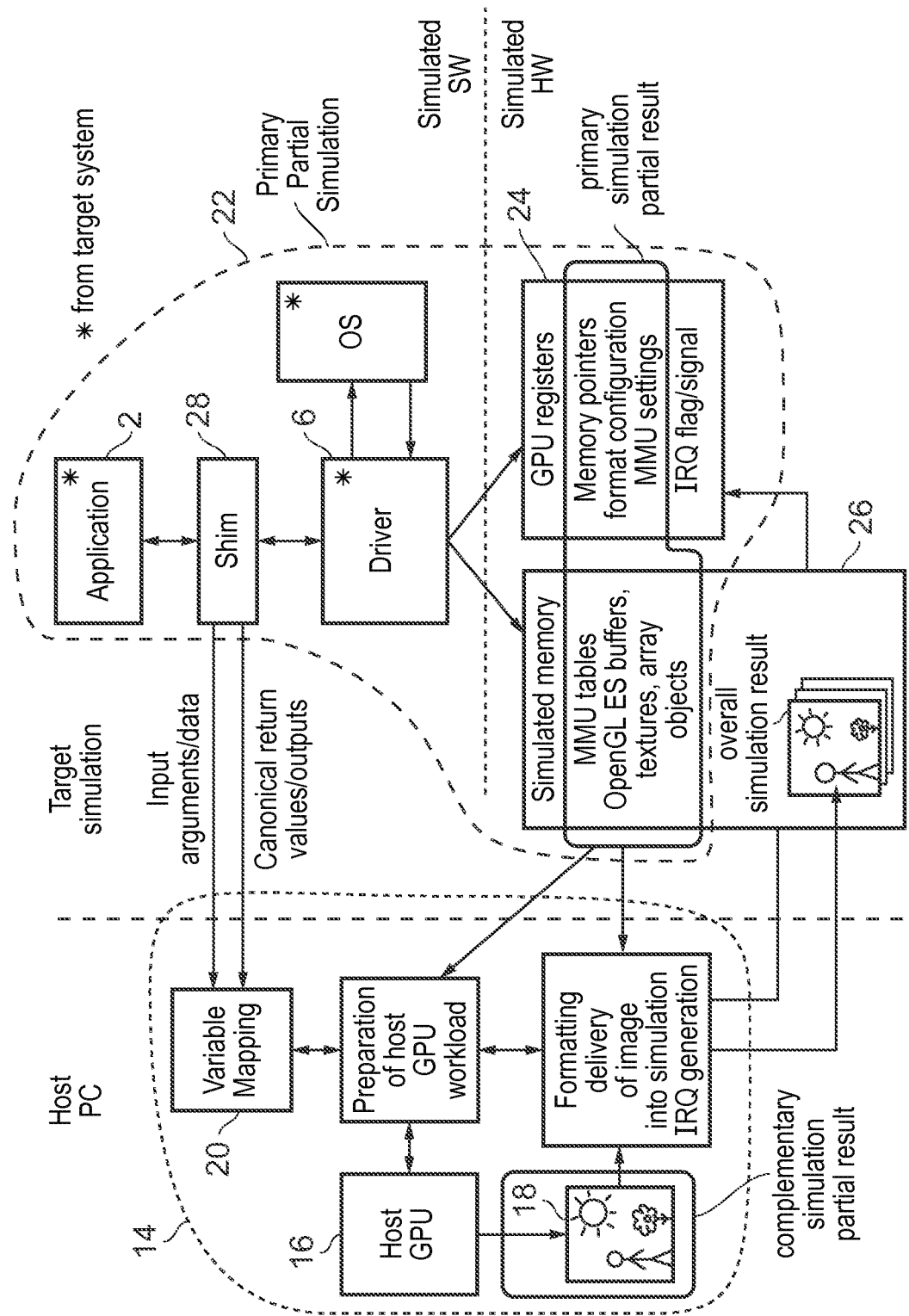
FIG. 2 schematically illustrates a simulation system.

FIG. 2 schematically illustrates a simulation system for simulating the interaction of the application program 2, the operating system 4 and the driver program 6 with the hardware elements 8, 10, 12 of FIG. 1. In particular, the simulation system includes a complementary partial simulation 14 which receives the workload data and uses a host graphics processing unit 16 provided within the host processor to execute that workload data. The host processor may be a standard computer which includes a graphics processing unit which is able to execute workload data in the form of OpenGL ES instructions and can accordingly generate output data 18 with a form substantially corresponding of that which should be generated by the graphics processing unit 10 of FIG. 1. The complementary partial simulation 14 may dynamically allocate variables when executing the OpenGL ES program commands and is provided with a two-way variable mapping unit 20 (e.g. software routine) using mapping data so as to translate between variables as used by the complementary partial simulation 14 and variables as used by the application program 2. It is also possible that the workload for the graphics processing unit of the host processor may require transformation before it can be executed, e.g. transformed from the OpenGL ES to OpenGL. The box "preparation of host GPU workload" in FIG. 2 performs this task as required.

The primary partial simulation 22 operates in parallel with the complementary partial simulation 14, but acquires its input data from a different level of abstraction. More particularly, the driver program 6 outputs commands to the primary partial simulation 22 corresponding to those which would be output from the driver program 6 to the graphics processing unit 10 in FIG. 1. The driver program 6 and the operating system 4 also interact with each other and with the primary partial simulation 22 to provide input data to the primary partial simulation 22, such as data indicating memory regions which have been allocated for use by the simulated target hardware device, servicing interrupt behaviour such as processing software interrupts and interrupts indicating progress through the workload as may be generated by the primary partial simulation 22 to coordinate action with the complementary partial simulation 14 and to correspond to the behaviour of the real graphics processing unit 10.

The primary partial simulation 22 generates primary partial result state data 24 which includes simulated hardware register content of registers within the target hardware device 10. In particular, these register contents may include memory pointers, format data specifying the format in which the output image data is to be provided, memory translation data for use by the simulated target hardware device 10 and pointers to additional input data as may be required by both the primary partial simulation 22 and the complementary partial simulation 14.

The host system, such as a general purpose computer, provides a simulated memory 26 corresponding to the memory 12 of FIG. 1. The complementary partial result state data 18 representing the output image may be written into this simulated memory 26 at a position indicated by one of the memory pointers and the memory address translation data as generated by the primary partial simulation 22 as part of the primary partial result state data 24. The complementary partial simulation 14 is able to read some of the primary partial result state data as generated by the complementary partial simulation 22 in order to modify its behaviour. For example, the driver program 6 may execute commands which configure the simulated target hardware to generate output data in a given format. This format data may be stored within the primary partial result state data 24 and then read by the complementary partial simulation 14 to control the form of the complementary partial result state data 18 so as to conform to the format which has been specified.

The complementary partial result state data 18 and the primary partial result state data 24 may include marker data serving to permit correlation between the complementary partial result state data and the primary partial result state data. This marker data can correspond to positions within the processing of the workload data reached at particular points so that the parallel execution of the complementary partial simulation 14 and the primary partial simulation 22 may be kept in sufficient synchronism. The primary partial simulation may execute a reserved software interrupt instruction to interrupt execution of the simulator and have it pass data from the primary partial simulation to the complementary partial simulation for handling therein.

A shim program 28 cooperates with the application program 2 and serves to direct the workload data to both the complementary partial simulation 14 and the driver program 6. The shim program 28 can also serve to fetch input data to the complementary partial simulation 14 based upon pointer values to the input data which may be provided as part of the workload data by the shim program 28 or the application program 2. In other embodiments the first partial simulation 14 may read these input data values from the simulated memory 26 itself using the pointer values passed to it.

Figure 3:
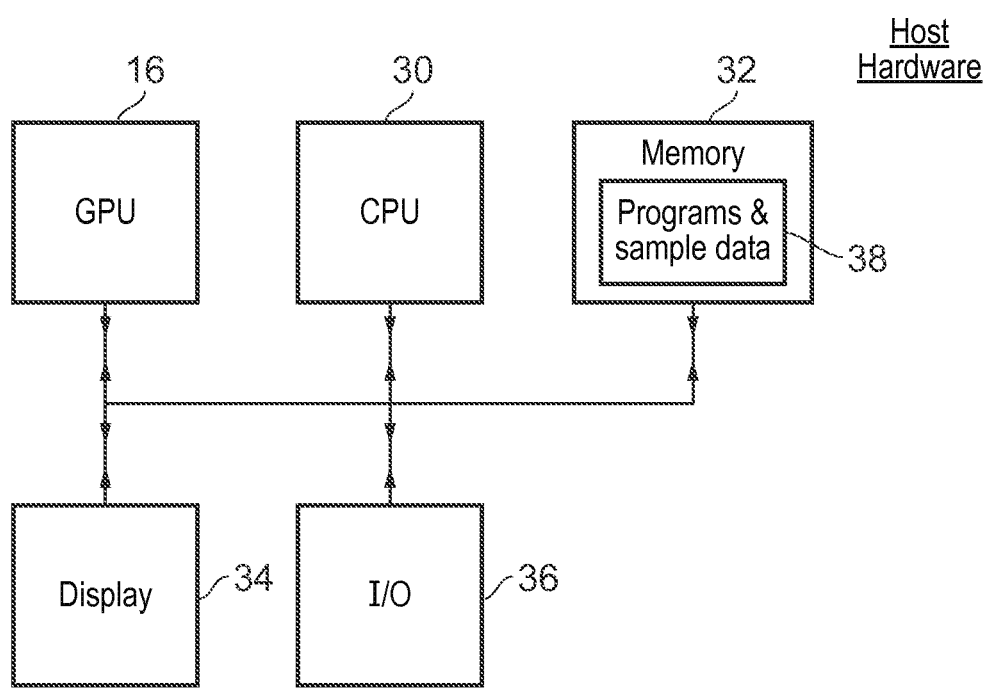
FIG. 3 schematically illustrates host computer system for implementing the simulation of FIG. 2.

FIG. 3 schematically illustrates a general purpose computer which may serve as a host for the simulation of FIG. 2. In particular, such a general purpose computer can include its own graphics processing unit 16 which is able to execute the workload data passed to the complementary partial simulation, such as OpenGL ES commands. The host computer further includes a general purpose processor 30, a memory 32, a display 34 and input output devices 36. This form of general purpose computer will be familiar to those in this technical field. Programs and data 38 stored within the memory 32 when executed by the system of FIG. 3 serve to provide the simulation system of FIG. 2.

There is one overall simulation, starting with a client application and ending up with the right graphical output in the right form, at the correct memory address etc. The system simulates some things properly, like the operation of the SW driver as it generates various bits of data for the target GPU to consume. Other things like the actual drawing of the image are simulated by taking advantage of the commonality of the high level API to pass the workload to another implementation (host GPU). To get the right image or to re-format it appropriately the system uses the data from the target GPU registers and/or simulated memory. The system might also acquire input data for the host GPU directly from the simulated memory to reduce the work happening inside the shim. The final combination of state gives the final image and any necessary outputs like a simulated interrupt signal and a register value indicating "Success—image rendered".

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

The invention claimed is:

1. A method of simulating execution of a processing workload by a target hardware device including generating result state data, said method comprising the steps of:
   providing workload data specifying said processing workload;
   passing said workload data both to a primary partial simulation and to a complementary partial simulation running in parallel, the primary partial simulation acquiring input data from a first level of abstraction of said target hardware, the complementary partial simulation acquiring input data from a second level of abstraction of said target hardware, and the first level of abstraction and the second level of abstraction being different from each other;
   simulating execution of said processing workload using said primary partial simulation to generate primary partial result state data representing at least part of said result state data; and
   simulating execution of said processing workload using said complementary partial simulation to generate complementary partial result state data representing at least part of said result state data.

2. A method as claimed in claim 1, comprising the step of combining said primary partial result data and said complementary partial result state data to generate said result state data.

3. A method as claimed in claim 1, wherein said workload data specifies said processing workload in a form independent of a hardware implementation of said target hardware device.

4. A method as claimed in claim 1, wherein said primary partial result state data includes simulated hardware register content of said target hardware.

5. A method as claimed in claim 1, wherein said complementary partial result state data includes output data to be stored within a memory as an output of said processing workload, said memory serving as a simulated memory of said target hardware.

6. A method as claimed in claim 5, wherein said primary partial result state data includes a memory pointer value indicating an address within said memory at which said output data is to be written.

7. A method as claimed in claim 5, wherein said primary partial result state data includes format data read by said complementary partial simulation and specifying one or more parameters of a format in which said output data is written in said memory by said complementary partial simulation.

8. A method as claimed in claim 5, wherein said second primary result state data includes one or more pointer values specifying respective addresses within said memory storing additional state data for use in said simulated execution of said processing workload.

9. A method as claimed in claim 5, wherein said second primary result state data includes memory address translation data corresponding to page table data used by a memory management unit of said target hardware and said complementary partial simulation reads said memory address translation data and generates memory addresses for said memory in dependence upon said memory address translation data.

10. A method as claimed in claim 1, wherein said complementary partial simulation is performed using a host processing device including host execution hardware having said processing workload as a native workload.

11. A method as claimed in claim 10, wherein said host execution hardware is a host graphics processing unit and said target device is a target graphics processing unit.

12. A method as claimed in claim 1, wherein said complementary partial simulation is performed by a device separated from a host device for said primary partial simulation.

13. A method as claimed in claim 1, wherein said processing workload is a hardware-independent graphics program.

14. A method as claimed in claim 13, wherein said primary partial simulation uses a target device driver for said target hardware device together with a target operating system to generate said primary partial result state data.

15. A method as claimed in claim 1, wherein said complementary partial result state data and said primary partial result state data both include marker data and said method comprises the step of correlating said complementary partial result state data with said primary partial result state data using said marker data.

16. A method as claimed in claim 1, comprising the step of translating between dynamic variables generated by said complementary partial simulation and dynamic variables generated by said primary partial simulation.

17. A method as claimed in claim 16, wherein said translating uses mapping data maintained as part of one of said complementary partial simulation and said primary partial simulation.

18. A method as claimed in claim 1, wherein said primary partial simulation includes executing software interrupt instructions to interrupt execution of said primary partial simulation and to trigger passing of a portion of said processing workload to said complementary partial simulation for simulation.

19. A method as claimed in claim 1, wherein said primary partial simulation generates a progress signal indicating completion of a portion of said processing workload in dependence upon detecting completion by said complementary partial simulation of a portion of said complementary partial result state data corresponding to said portion of said processing workload.

20. A method as claimed in claim 19, wherein said progress signal simulates an interrupt signal generated by said target hardware device.

21. A method as claimed in claim 1, wherein said workload data includes one or more pointer values pointing to input data values for use by said complementary partial simulation and one of:

said complementary partial simulation uses said one or more pointer values to read said input data values from result state data; and said input data values are read by a shim program using said one or pointer values and are passed to said complementary partial simulation by said shim program.

22. Apparatus for executing a processing workload specified by workload data to generate result state data in place of a target hardware device, said apparatus comprising a processor system including one or more processors, the processor system being configured to at least:

pass said workload data both to a primary simulation and to a complementary simulation; wherein execute said processing workload in said primary simulation to generate primary partial result state data representing at least part of said result state data; and execute said processing workload in said complementary simulation to generate complementary partial result state data representing at least part of said result state data, wherein said primary partial simulation and said complementary partial simulation are configured to run in parallel and to acquire input data from a first level of abstraction and a second level of abstraction of said target hardware respectively, the first level of abstraction being different from the second level of abstraction.

23. A non-transitory computer-readable storage medium, having computer-executable instructions stored thereon, wherein, upon being executed by one or more processors of a computer, the computer-executable instructions cause the one or more processors to:

provide workload data specifying a processing workload;

pass said workload data both to a primary partial simulation and to a complementary partial simulation running in parallel, the primary partial simulation acquiring input data from a first level of abstraction of a target hardware, the complementary partial simulation acquiring input data from a second level of abstraction of said target hardware, and the first level of abstraction and the second level of abstraction being different from each other;

simulate execution of said processing workload using said primary partial simulation to generate primary partial result state data representing at least part of a result state data; and simulate execution of said processing workload using said complementary partial simulation to generate complementary partial result state data representing at least part of said result state data.

* * * * *